(12) United States Patent
Kuriyama

(10) Patent No.: US 11,713,844 B2
(45) Date of Patent: Aug. 1, 2023

(54) SUPPORT DEVICE

(71) Applicant: Panasonic Intellectual Property Management Co., Ltd., Osaka (JP)

(72) Inventor: Kazuhiko Kuriyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 178 days.

(21) Appl. No.: 17/246,669

(22) Filed: May 2, 2021

(65) Prior Publication Data

US 2021/0348711 A1 Nov. 11, 2021

(30) Foreign Application Priority Data

May 8, 2020 (JP) ................................ 2020-082651

(51) Int. Cl.
*F16M 11/14* (2006.01)
*F16M 11/24* (2006.01)
(Continued)

(52) U.S. Cl.
CPC ............. *F16M 11/14* (2013.01); *F16M 11/08* (2013.01); *F16M 11/242* (2013.01);
(Continued)

(58) Field of Classification Search
CPC ................. F16M 11/14; F16M 11/242; F16M 2200/022; F16M 13/04; F16M 11/08;
(Continued)

(56) References Cited

U.S. PATENT DOCUMENTS 1,536,985 A * 5/1925 Swinford ............. F16M 11/242
411/935
3,632,073 A * 1/1972 Nakatani ................ F16M 11/14
248/169
(Continued)

FOREIGN PATENT DOCUMENTS

CN 205618923 U 10/2016
JP S51-8736 U 1/1976
(Continued)

OTHER PUBLICATIONS

Office Action for corresponding Japanese patent Application No. 2020-082651 dated Jul. 7, 2020 with its machine translation.
(Continued)

*Primary Examiner* — Ingrid M Weinhold
(74) *Attorney, Agent, or Firm* — Renner, Otto, Boisselle & Sklar, LLP

(57) ABSTRACT

Adjustment of a posture of a ball joint is facilitated. A support device includes a pan head unit, a ball joint having a first end to which the pan head unit is attached and a second end provided with a ball portion, a ball holder configured to selectively fix the ball portion, a ball fixing screw connected to the ball holder and configured to move the ball holder between a locked position at which the ball portion is fixed and an unlocked position at which the ball portion is freely rotatable, and an elastic member configured to urge the ball holder toward the ball portion. The ball holder and the ball fixing screw are connected to each other so as to be strokable with a predetermined stroke amount. The predetermined stroke amount is smaller than a movement amount of the ball fixing screw between a first position corresponding to the locked position and a second position corresponding to the unlocked position.

7 Claims, 12 Drawing Sheets

(51) Int. Cl.
　　　*F16M 13/04*　　　(2006.01)
　　　*F16M 11/08*　　　(2006.01)
　　　*G03B 17/56*　　　(2021.01)
(52) U.S. Cl.
　　　CPC ........... *F16M 13/04* (2013.01); *G03B 17/561*
　　　　　(2013.01); *F16M 2200/022* (2013.01)
(58) Field of Classification Search
　　　CPC ............... F16M 11/126; F16M 11/041; Y10T
　　　　　　403/32745; Y10T 403/32754; Y10T
　　　　　　403/32762; Y10T 403/32811; Y10T
　　　　　　403/32311; Y10T 403/32631; Y10T
　　　　　　403/32737; Y10T 403/32368; Y10T
　　　　　　403/32401; Y10T 403/32409; Y10T
　　　　　　403/32204; Y10T 403/32196; Y10T
　　　　　　403/32573; Y10T 403/32565; F16C
　　　　　11/106; F16C 11/0695; G03B 17/561;
　　　　　　　　　　　　　　　G03B 17/566
　　　USPC ....... 248/181.1, 186.2, 187.1, 288.51, 176.3,
　　　　　　　　　　　　　　　　248/296.1
　　　See application file for complete search history.

(56) References Cited

U.S. PATENT DOCUMENTS

| | | | | |
|---|---|---|---|---|
| 4,121,799 A * | 10/1978 | Michio | ................... | F16M 11/38 248/188.7 |
| 4,214,724 A | 7/1980 | Geiger | | |
| 4,795,118 A | 1/1989 | Kosugi | | |
| 5,652,935 A | 7/1997 | Kusaka | | |
| 6,234,690 B1 * | 5/2001 | Lemieux | ................ | F16M 13/00 396/419 |
| 8,414,202 B2 * | 4/2013 | Li | ........................ | F16M 11/14 396/428 |
| 11,353,781 B2 * | 6/2022 | Zou | ...................... | F16M 11/242 |
| 2020/0025330 A1 * | 1/2020 | Li | ...................... | F16M 11/2078 |
| 2021/0294186 A1 * | 9/2021 | Zou | ...................... | F16M 11/242 |

FOREIGN PATENT DOCUMENTS

| | | |
|---|---|---|
| JP | S57-48718 B2 | 10/1982 |
| JP | 59-058294 U | 4/1984 |
| JP | S63-210494 A | 9/1988 |
| JP | S63-303298 A | 12/1988 |
| JP | 64-045098 U | 3/1989 |
| JP | 01-149094 U | 10/1989 |
| JP | 3002484 U | 9/1994 |
| JP | H09-005878 A | 1/1997 |
| JP | H10-160094 A | 6/1998 |
| JP | 2006-081282 A | 3/2006 |

OTHER PUBLICATIONS

Office Action for corresponding Japanese patent Application No. 2020-082651 dated Sep. 23, 2020 with its machine translation.
Final Office Action for corresponding Japanese patent Application No. 2020-082651 dated Dec. 15, 2020 with its machine translation.

* cited by examiner

SUPPORT DEVICE

BACKGROUND OF THE INVENTION

Field of the Invention

The present disclosure relates to a support device that supports a camera or the like.

Description of the Related Art

For example, JP H10-160094 A discloses a support device including a ball joint having a ball portion at a first end and a pan head at a second end. By rotating a locking knob (ball fixing screw), the ball portion is fixed or freely rotatable. As a result, the posture of the camera attached to the pan head, that is, the ball joint can be adjusted and maintained in a desired posture.

SUMMARY OF THE INVENTION

In recent years, there has been a demand for a support device capable of easily adjusting a posture of a camera. For example, in a support device including a one-hand grip for a user to hold with one hand, the user is to adjust the posture of the camera with the hand that is not holding the one-hand grip. However, when the ball joint is fixed with the ball fixing screw as in the support device disclosed in JP H10-160094 A, the user is to rotate the ball fixing screw while holding the one-hand grip with one hand and maintaining the desired posture of the camera (ball joint) with the other hand.

In a support device, an object of the present disclosure is therefore to facilitate adjustment of a posture of a camera or the like attached to the support device.

One aspect of the present disclosure provides a support device including a pan head unit, a ball joint having a first end to which the pan head unit is attached and a second end provided with a ball portion, a ball holder configured to selectively fix the ball portion, a ball fixing screw connected to the ball holder and configured to move the ball holder between a locked position at which the ball portion is fixed and an unlocked position at which the ball portion is freely rotatable, and an elastic member configured to urge the ball holder toward the ball portion, in which the ball holder and the ball fixing screw are connected to each other so as to be strokable with a predetermined stroke amount, and the predetermined stroke amount is smaller than a movement amount of the ball fixing screw between a first position corresponding to the locked position and a second position corresponding to the unlocked position.

Another aspect of the present disclosure provides a support device including a pan head unit, a ball joint having a first end to which the pan head unit is attached and a second end provided with a ball portion, a ball holder configured to selectively fix the ball portion, a ball fixing screw configured to move the ball holder, and an elastic member configured to urge the ball holder toward the ball portion, in which when the ball fixing screw rotates and moves, a state of the ball portion is changed sequentially to a fully locked state in which the ball fixing screw maintains contact between the ball portion and the ball holder, a half locked state in which the ball portion is not freely rotatable due to the elastic member urging the ball holder but rotatable by an external force, and an unlocked state in which the ball portion is freely rotatable.

Still another aspect of the present disclosure provides a support device including a casing and a pan head unit provided on the casing, in which the pan head unit includes a rotating stage having a mounting surface and a reverse surface opposite to the mounting surface, a stage support member rotatably supporting the rotating stage about a rotation center line orthogonal to the mounting surface, and a stage fixing member provided on the stage support member so as to be movable in an extending direction of the rotation center line and selectively fixing the rotating stage, and the reverse surface of the rotating stage and the stage fixing member each include an engaging portion engaging with each other in the extending direction of the rotation center line.

In the present disclosure, in the support device, a posture of a camera or the like attached to the support device can be easily adjusted.

DESCRIPTION OF THE PREFERRED EMBODIMENT

Hereinafter, embodiments will be described in detail with reference to the drawings as appropriate. Unnecessarily detailed descriptions may be omitted. For example, a detailed description of well-known matters and a duplicate description of substantially the same configuration may be omitted. This is to avoid unnecessary redundancy in the following description and to facilitate understanding by those skilled in the art.

It should be noted that the accompanying drawings and the following description are provided by the inventor(s) for those skilled in the art to fully understand the present disclosure, and are not intended to limit the subject matter described in the claims.

A support device according to one embodiment of the present disclosure will be described below with reference to the drawings.

Figure 1:
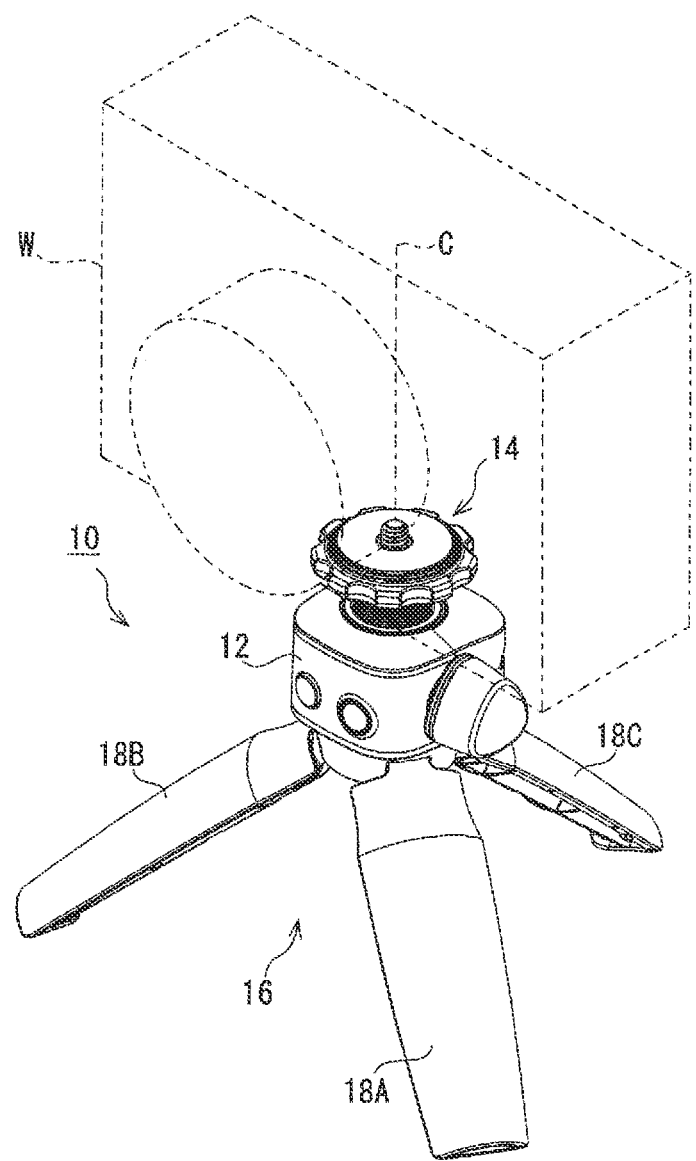
FIG. 1 is a perspective view of a support device in a tripod mode according to one embodiment of the present disclosure.
Figure 1:
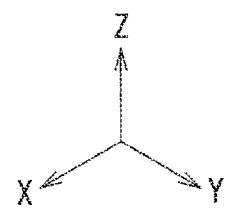
Figure 2:
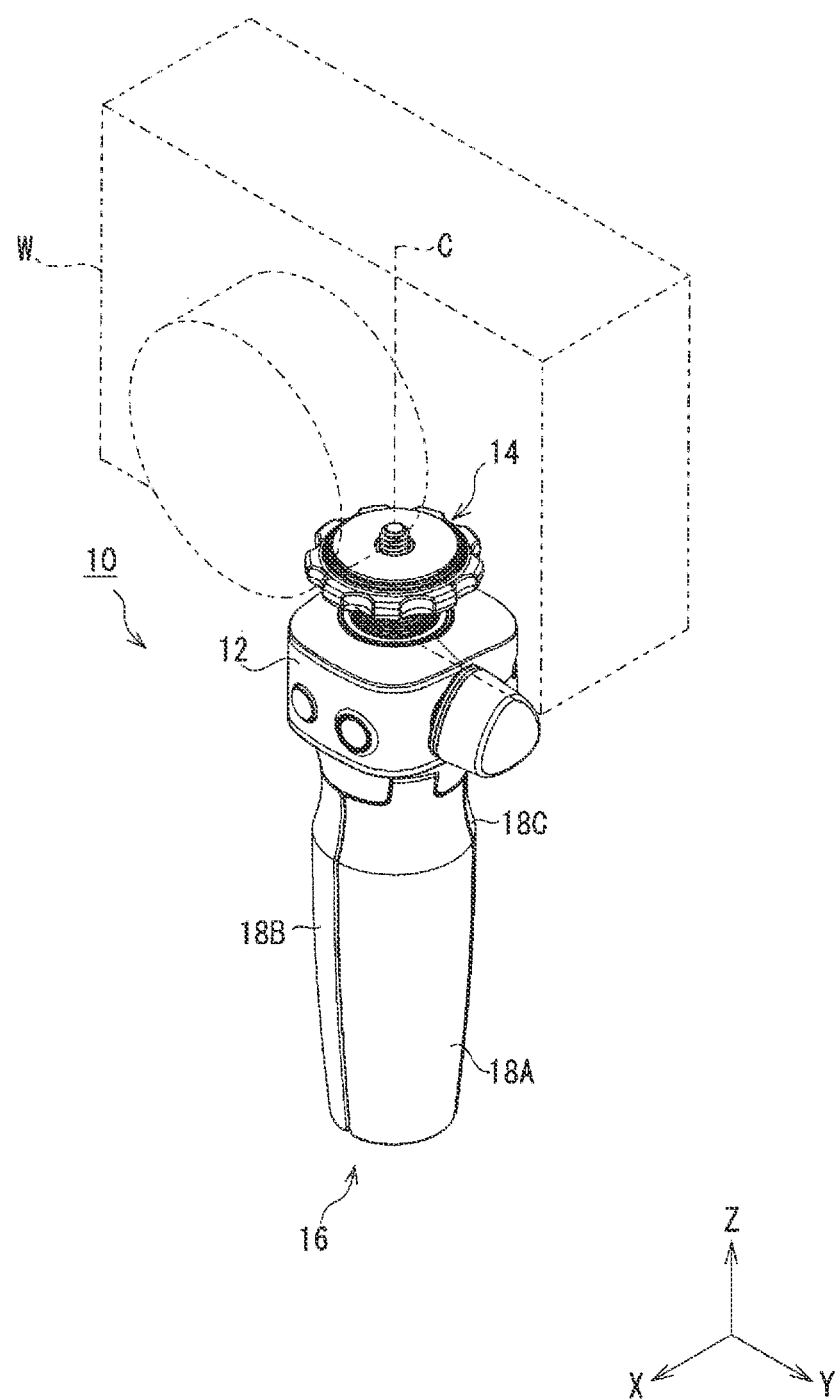
FIG. 2 is a perspective view of the support device in a one-hand grip mode.

FIGS. 1 and 2 are schematic perspective views of the support device according to one embodiment of the present disclosure. FIG. 1 shows the support device in a tripod mode, and FIG. 2 shows the support device in a one-hand grip mode. An X-Y-Z coordinate system shown in the drawings is for facilitating the understanding of the present disclosure, and does not limit the present disclosure.

As shown in FIGS. 1 and 2, a support device 10 is a device that supports a camera W or the like such that a posture of the camera W or the like is adjustable.

As shown in FIGS. 1 and 2, the support device 10 includes a casing 12, a pan head unit 14 to which a camera W or the like is fixed, and a tripod unit 16 provided on the casing 12.

As shown in FIGS. 1 and 2, the tripod unit 16 includes three legs 18A to 18C and is configured to be transformable into a one-hand grip. Specifically, first ends of the three legs 18A to 18C are fixed to the casing 12 so as to be swingable. Thus, second ends of the three legs 18A to 18C can approach each other or be separated from each other.

When the second ends of the three legs 18A to 18C are separated from each other, the three legs 18A to 18C function as a tripod (tripod mode) as shown in FIG. 1. As a result, a user can place the support device 10 at a predetermined position.

On the other hand, when the second ends of the three legs 18A to 18C are close to each other, the three legs 18A to 18C form one one-hand grip (one-hand grip mode) as shown in FIG. 2. As a result, the user can hold the support device 10 with one hand with the one-hand grip.

Figure 3:
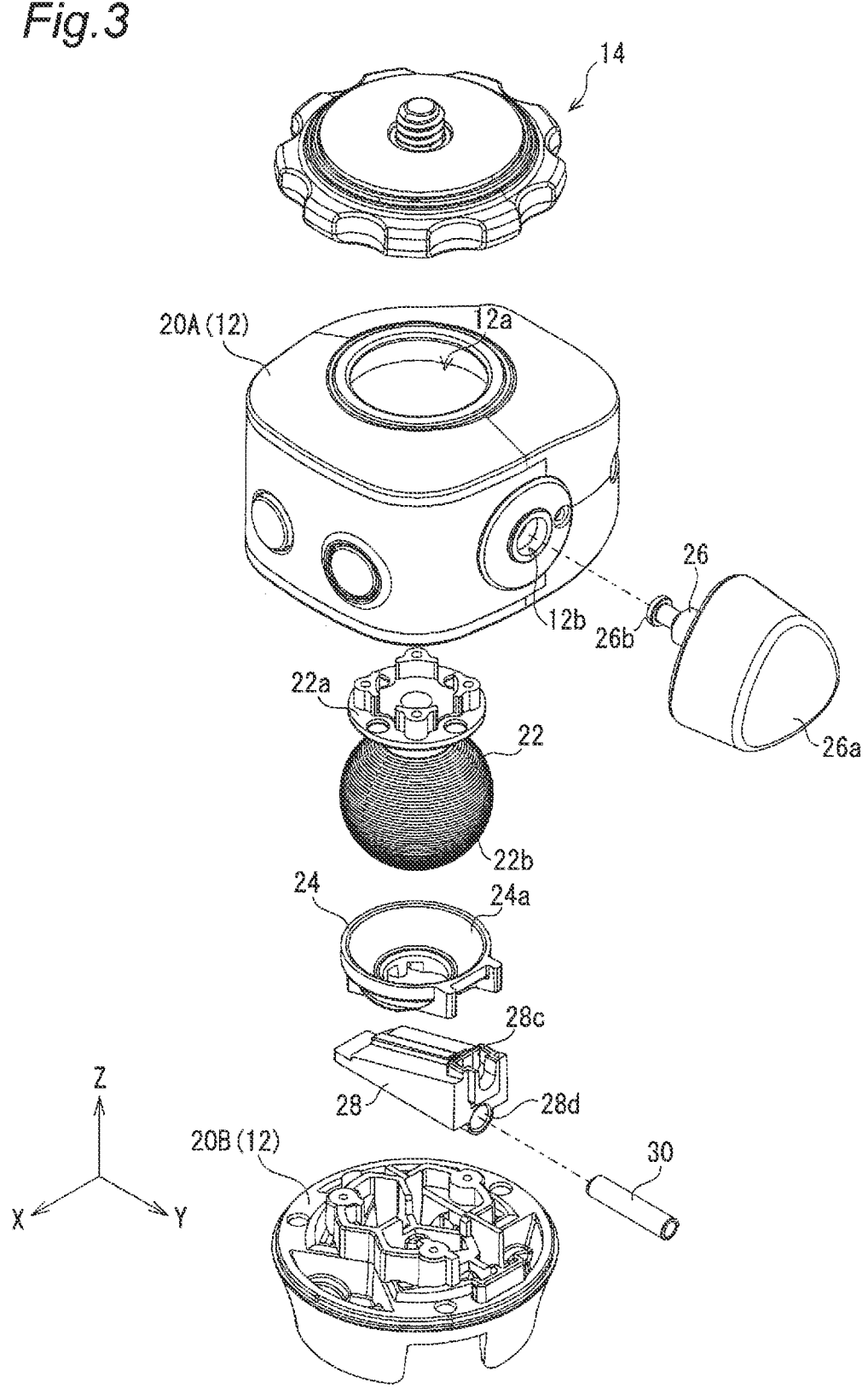
FIG. 3 is an exploded perspective view of a part of the support device.
Figure 4A:
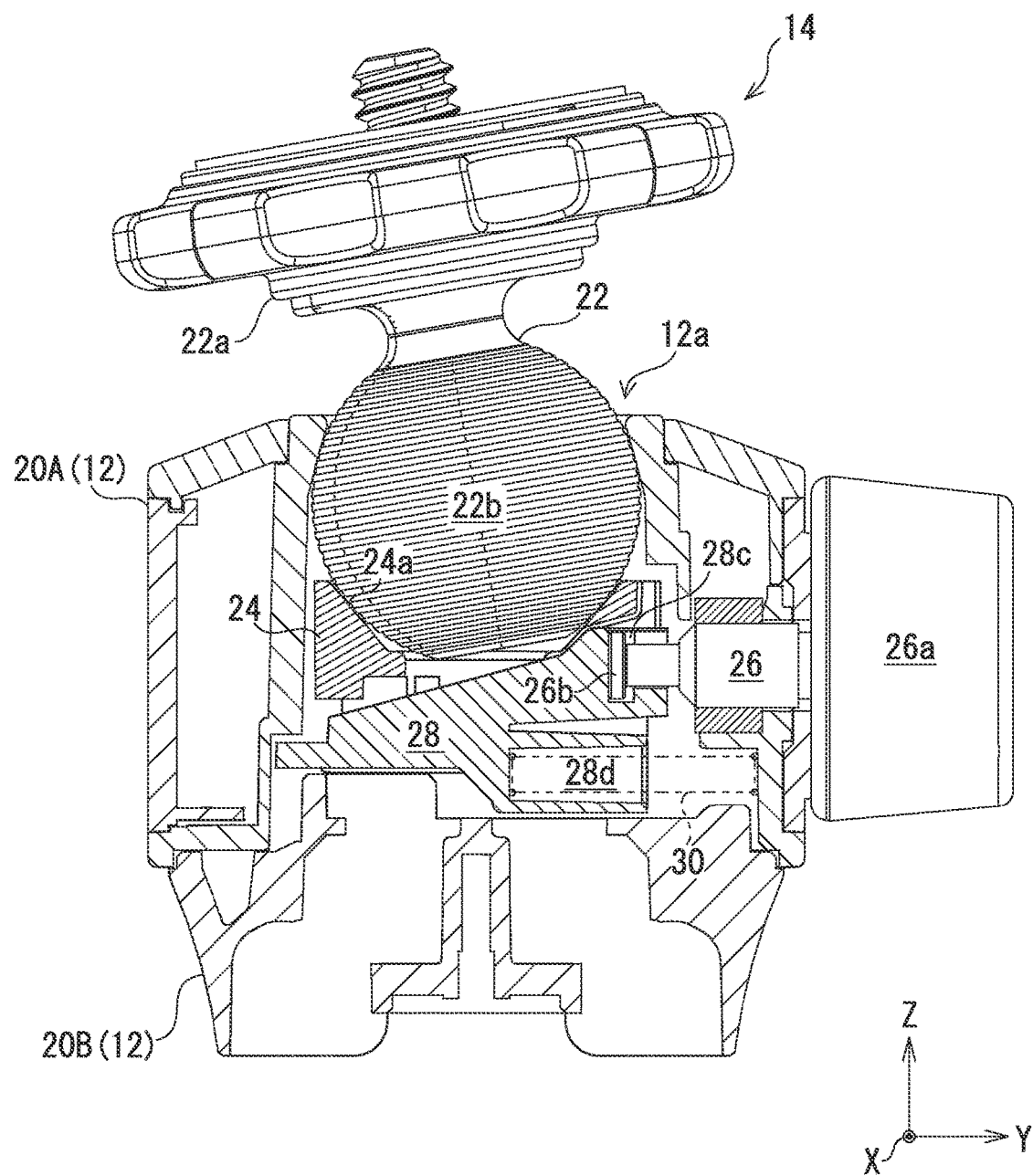
FIG. 4A is a sectional view of a part of the support device in a fully locked state.
Figure 4B:
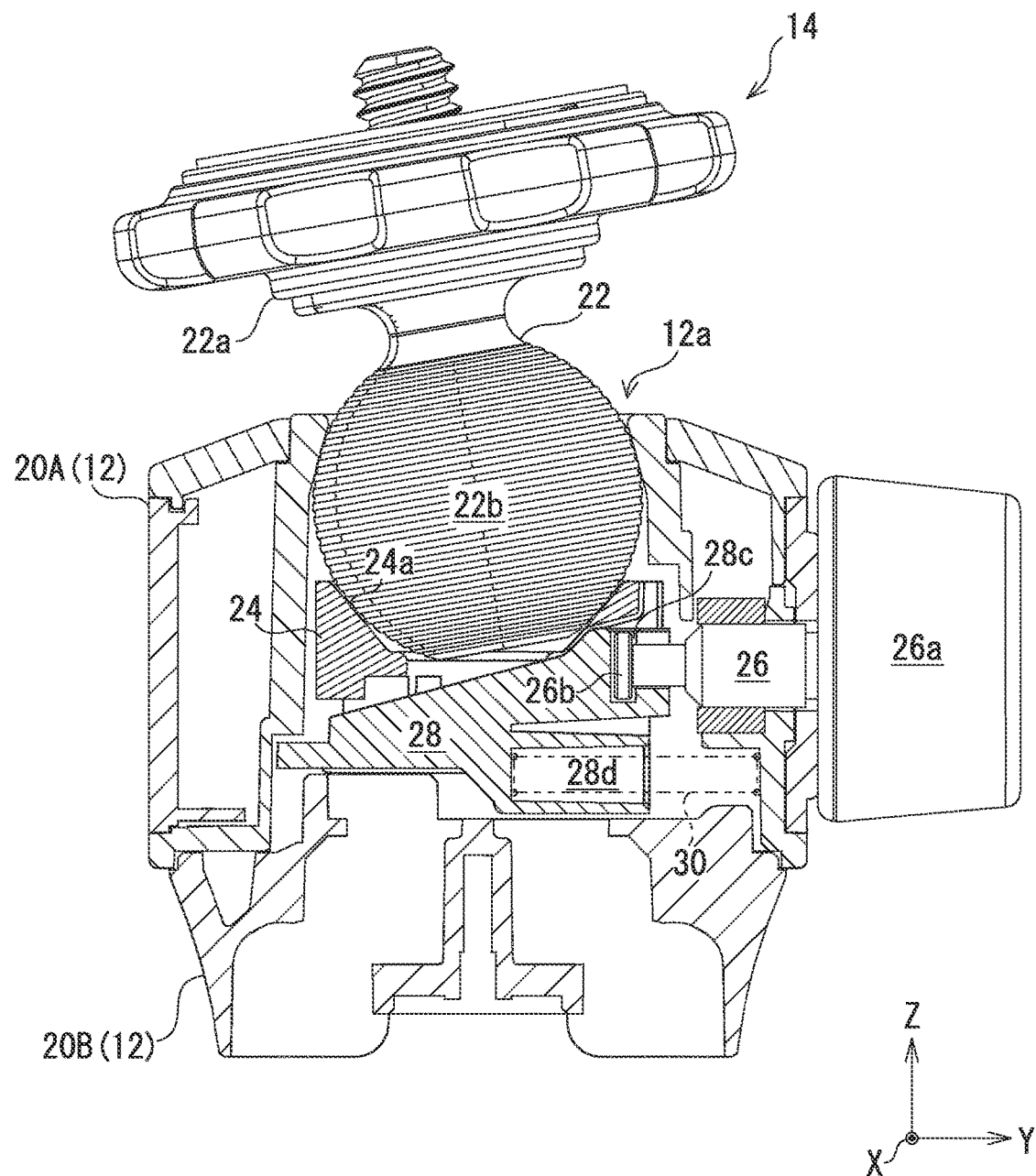
FIG. 4B is a sectional view of a part of the support device in a half locked state.
Figure 4C:
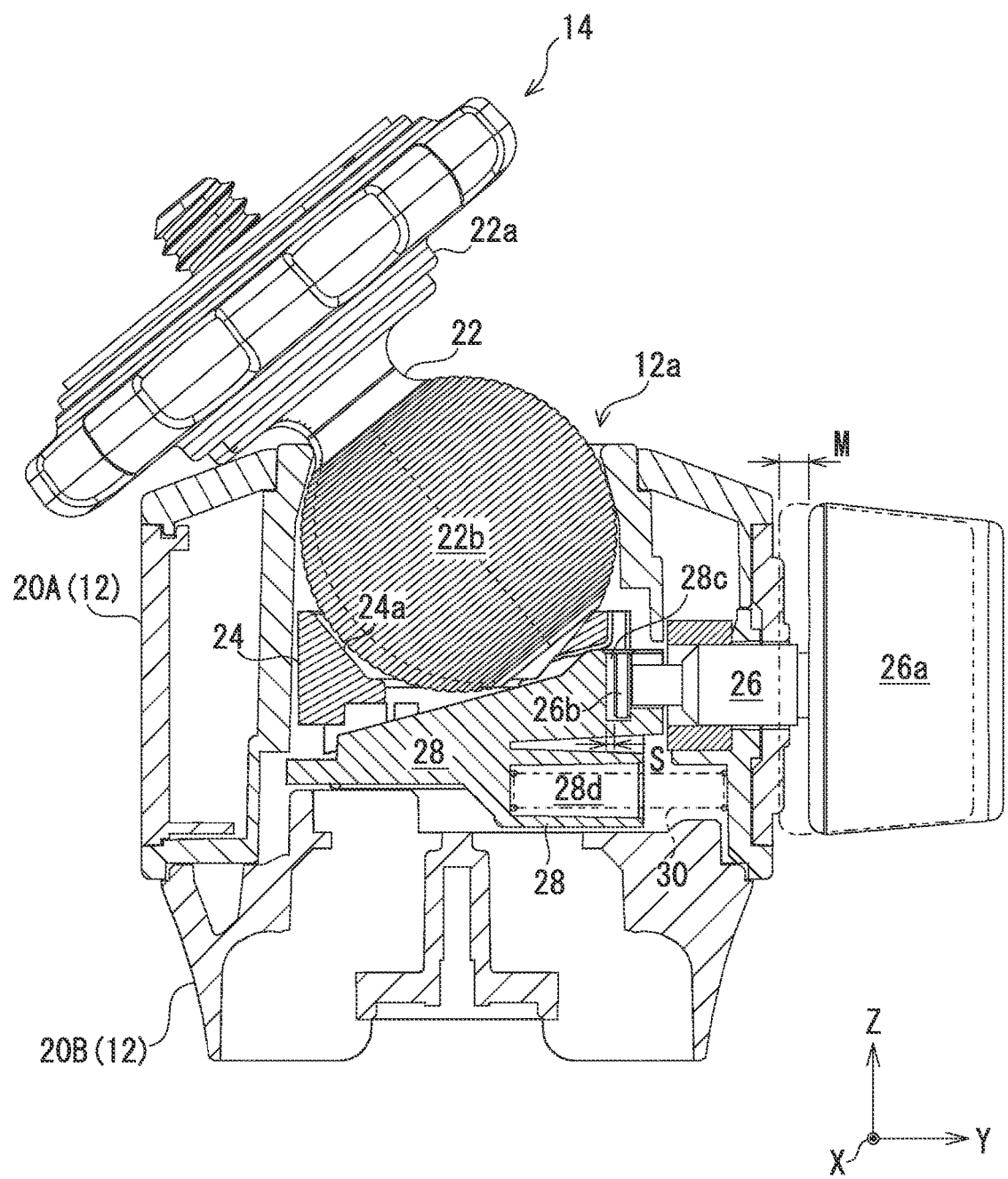
FIG. 4C is a sectional view of a part of the support device in an unlocked state.

FIG. 3 is an exploded perspective view of a part of the support device except for the tripod unit. FIGS. 4A to 4C are sectional views of a part of the support device except for the tripod unit. FIGS. 4A to 4C show the support device in different states, which will be described in detail later.

As shown in FIG. 3, the support device 10 has a ball joint 22 in the casing 12. Specifically, the casing 12 of the support device 10 includes an upper casing 20A and a lower casing 20B. A part of the ball joint 22 is housed inside the casing 12 defined by the upper casing 20A and the lower casing 20B.

The ball joint 22 includes a first end 22a to which the pan head unit 14 is attached and a second end (ball portion) 22b having a ball-like shape. In the present embodiment, the first end 22a of the ball joint 22 configures a part of the pan head unit 14, which will be described in detail later.

The ball portion 22b of the ball joint 22 is housed in the casing 12 as shown in FIGS. 4A to 4C. Specifically, a part of the ball portion 22b is exposed through an opening 12a provided in the casing 12. The opening 12a is smaller than a cross section of the ball portion 22b at a maximum diameter. As a result, the ball joint 22 is provided on the casing 12 in a state where the first end 22a is located outside the casing 12 without falling out of the casing 12.

As shown in FIGS. 4A to 4C, the ball portion 22b of the ball joint 22 is provided on the casing 12 so as to be freely rotatable. This can change a posture of the ball joint 22, that is, the posture of the camera W attached to the ball joint 22 via the pan head unit 14 (posture with respect to the casing 12). In order to maintain the posture of the camera W desired by the user, the support device 10 has a ball holder 24 selectively fixing the ball portion 22b of the ball joint 22 and a ball fixing screw 26 moving the ball holder 24. Further, in the present embodiment, the support device 10 has a cam member 28 interposed between the ball holder 24 and the ball fixing screw 26 and a spring 30 urging the cam member 28.

As shown in FIGS. 4A to 4C, the ball holder 24 is housed in the casing 12 and is supported by the casing 12 so as to be movable in a Z-axis direction. Further, as shown in FIG. 3, the ball holder 24 includes a hemispherical and concave ball holding surface 24a that engages with the ball portion 22b of the ball joint 22 and contacts the ball portion 22b.

As shown in FIG. 3, the ball fixing screw 26 penetrates the through hole 12b provided in the casing 12 and is connected to the ball holder 24. In the present embodiment, the ball fixing screw 26 is indirectly connected to the ball holder 24 via the cam member 28. The ball fixing screw 26 is screwed into the casing 12 and is supported by the casing 12 so as to be movable in a Y-axis direction. That is, in the present embodiment, a moving direction of the ball holder 24 (Z-axis direction) and a moving direction of the ball fixing screw 26 are orthogonal to each other. Further, a knob 26a for the user to rotate the ball fixing screw 26 is provided at a first end located outside of the casing 12. Further, the ball fixing screw 26 is provided with a disc-shaped diameter expansion portion 26b for connecting to the cam member 28 at a second end located in the casing 12.

As shown in FIGS. 4A to 4C, the cam member 28 is housed in the casing 12 and is supported by the casing 12 so as to be movable in the Y-axis direction. Further, the cam member 28 is interposed between the ball holder 24 and the ball fixing screw 26, and connects the ball holder 24 and the ball fixing screw 26. In other words, the cam member 28 converts a movement of the ball fixing screw 26 in the Y-axis direction into a movement of the ball holder 24 in the Z-axis direction.

Figure 5:
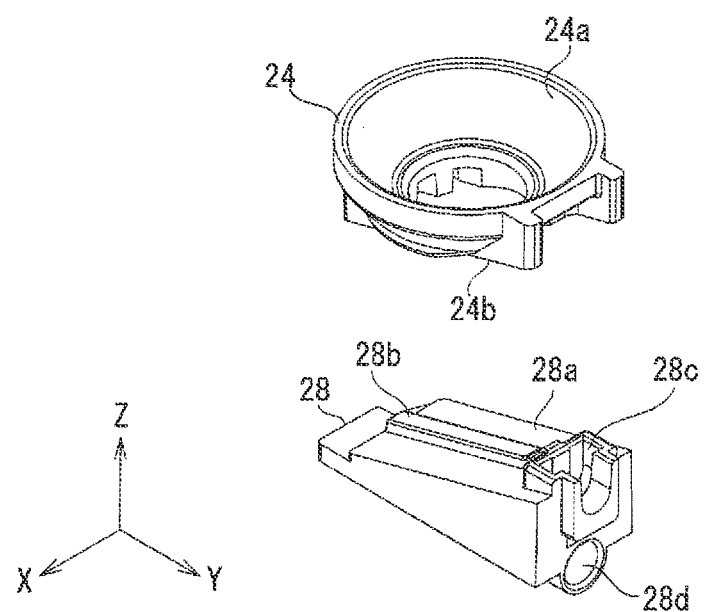
FIG. 5 is a top perspective view of a ball holder and a cam member.

FIG. 5 is a top perspective view of the ball holder and the cam member. Further, FIG. 6 is a bottom perspective view of the ball holder and the cam member.

Figure 6:
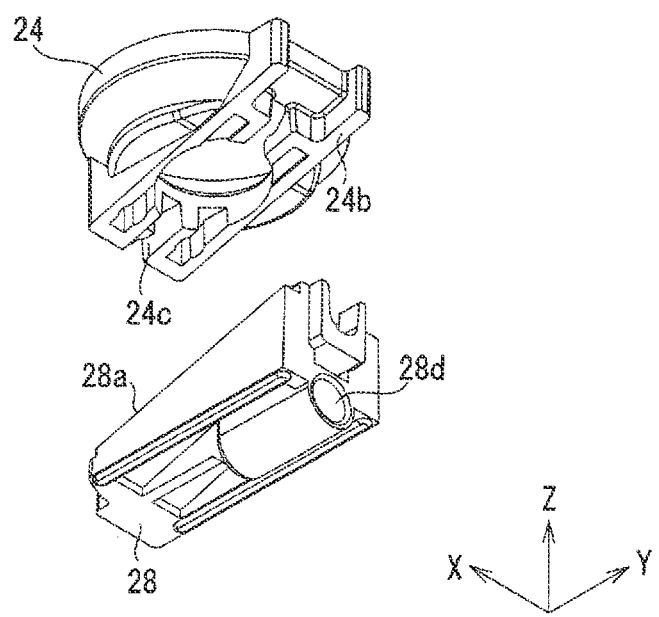
FIG. 6 is a bottom perspective view of the ball holder and the cam member.

As shown in FIGS. 5 and 6, the cam member 28 includes a cam surface 28a which is an inclined surface that diagonally intersects the moving direction of the ball fixing screw 26 (Y-axis direction). In the present embodiment, the cam surface 28a faces in an opposite direction to the ball fixing screw.

The ball holder 24 includes a cam follower surface 24b that diagonally intersects the moving direction of the ball holder 24 (Z-axis direction) and contacts the cam surface 28a of the cam member 28.

When the cam member 28 moves in the Y-axis direction, by the contact of the cam follower surface 24b with the cam surface 28a, the ball holder 24 moves in the Z-axis direction.

In order to restrict the movement of the cam follower surface 24b with respect to the cam surface 28a in the X-axis direction, the cam surface 28a is provided with a guide rail 28b extending in the Y-axis direction, and the cam follower surface 24b is provided with a guide groove 24c that engages with the guide rail 28b.

Further, the cam member 28 includes an engaging portion 28c engaging with and connecting to the diameter expansion portion 26b of the ball fixing screw 26. The engaging portion 28c has a pocket shape capable of housing the diameter expansion portion 26b. Further, as shown in FIGS. 4A to 4C, the engaging portion 28c engages with diameter expansion portion 26b such that the diameter expansion portion 26b is strokable inside the engaging portion 28c in the moving direction of the ball fixing screw 26 (Y-axis direction) with a predetermined stroke amount S. As a result, the cam member 28 and the ball fixing screw 26 are connected to each other so as to be strokable with the predetermined stroke amount S. In other words, the ball holder 24 and the ball fixing screw 26 are connected to each other via the cam member 28 so as to be strokable with the predetermined stroke amount S. The predetermined stroke amount S will be described in detail later.

Further, the cam member 28 is urged by the spring 30 as shown in FIGS. 4A to 4C. Specifically, the cam member 28 includes a spring housing hole 28d that opens in the moving direction of the ball fixing screw 26 (Y-axis direction) at an end surface close to the ball fixing screw 26. The spring 30 urges the ball holder 24 toward the ball portion 22b of the ball joint 22 via the cam member 28.

The fixing and releasing of the ball portion 22b of the ball joint 22 by the ball holder 24, the ball fixing screw 26, the cam member 28, and the spring will be described.

FIG. 4A shows the ball portion 22b of the ball joint 22 in a fully locked state, where the ball portion 22b is fixed by the ball fixing screw 26. At this time, in a moving range of the ball fixing screw 26, the ball fixing screw 26 (the diameter expansion portion 26b) is located at an innermost position (left in the figure) in the casing 12 (first position).

Further, as shown in FIG. 4A, the diameter expansion portion 26b (end surface opposite to the knob 26a) of the ball fixing screw 26 located at the first position keeps in contact with the cam member 28 in the moving direction (Y-axis direction) of the ball fixing screw 26 and keeps fixing the cam member 28. At this time, in a moving range of the cam member 28, the cam member 28 is located at an innermost position (left in the figure) in the casing 12. As a result, the ball holder 24 contacts the ball portion 22b of the ball joint 22 and is maintained in a locked position for fixing the ball portion 22b. As a result, the ball holder 24 keeps in contact with the ball portion 22b of the ball joint 22 with a relatively strong pressing force, and the ball portion 22b of the ball joint 22 is maintained unrotatable (fully locked state).

As shown in FIG. 4A, when the ball portion 22b of the ball joint 22 is fixed by the ball fixing screw 26 (fully locked state), the spring 30 urging the cam member 28 with a relatively small force.

FIG. 4B shows the ball portion 22b of the ball joint 22 in a half locked state, where the ball portion 22b is fixed by the spring 30. At this time, the ball fixing screw 26 is shifted to the outside of the casing 12 from the first position shown in FIG. 4A. Further, the diameter expansion portion 26b of the ball fixing screw 26 is not in contact with the cam member 28 in the moving direction of the ball fixing screw 26 (Y-axis direction).

As shown in FIG. 4B, the cam member 28 is not fixed by the ball fixing screw 26, but is fixed at the innermost position shown in FIG. 4A by being urged by the spring 30. That is, when the ball fixing screw 26 moves from the first position shown in FIG. 4A to the position shown in FIG. 4B, the cam member 28 does not move. The ball fixing screw 26 only strokes the cam member 28.

The cam member 28 is urged by the spring 30, and thus the ball holder 24 contacts the ball portion 22b of the ball joint 22 and is maintained in a locked position for fixing the ball portion 22b. However, the cam member 28 is fixed by the spring 30 instead of the ball fixing screw 26, and the ball holder 24 keeps in contact with the ball portion 22b of the ball joint 22 with a relatively small pressing force. As a result, the ball portion 22b of the ball joint 22 does not rotate freely due to the weight of the pan head unit 14, but is maintained rotatable by an external force, for example, manually by the user (half locked state).

FIG. 4C shows the ball portion 22b of the ball joint 22 in an unlocked state, where the ball portion 22b is not fixed by the ball fixing screw 26 and the spring 30 and is rotatable freely. At this time, the ball fixing screw 26 is located at a farthest position (right in the figure) from the first position shown in FIG. 4A outside of the casing 12 (second position). In FIG. 4C, the knob 26a of the ball fixing screw 26 located at the first position is shown by a chain double-dashed line.

As shown in FIG. 4C, the diameter expansion portion 26b (end surface close to the knob 26a) of the ball fixing screw 26 located at the second position keeps in contact with the cam member 28 in the moving direction (Y-axis direction) of the ball fixing screw 26 and shifts the cam member 28. At this time, in a moving range of the cam member 28, the cam member 28 is located at a front end (right in the figure) in the casing 12. Thus, the ball holder 24 is located at the unlocked position where the ball portion 22b of the ball joint 22 is freely rotatable. As a result, the ball holder 24 is not in contact with or keeps in contact with the ball portion 22b of the ball joint 22 with such a force that the ball portion 22b is freely rotatable, and the ball portion 22b of the ball joint 22 is maintained freely rotatable (unlocked state).

In summary, when the ball fixing screw 26 rotates and moves from the first position shown in FIG. 4A to the second position shown in FIG. 4C, a device for maintaining the ball holder 24 at the locked position and fixing the ball portion 22b of the ball joint 22 is changed from the ball fixing screw 26 to the spring 30. As a result, the ball portion 22b of the ball joint 22 shifts from a state in which the ball portion 22b is unrotatable (fully locked state) to a state in which the ball portion 22b is not freely rotatable but is rotatable by an external force (half locked state). Then, as shown in FIG. 4C, when the ball fixing screw 26 is located at the second position, the ball holder 24 is maintained at the unlocked position, and the ball portion 22b of the ball joint 22 is freely rotatable.

In order to shift the state in which the ball portion 22b of the ball joint 22 is fixed, the predetermined stroke amount S of the ball fixing screw 26 and the cam member 28 to each other has to be smaller than a movement amount M of the ball fixing screw 26 between the first position and the second position such that the cam member 28 is shifted away from the ball portion 22b, as shown in FIG. 4C. As a result, while the ball fixing screw 26 and the cam member 28 are stroking each other, the spring 30 urges the ball holder 24 via the cam member 28, and the ball portion 22b of the ball joint 22 and the ball holder 24 can be maintained in contact with each other. That is, the ball portion 22b of the ball joint 22 can be in the half locked state.

With this ball joint 22, for example, by holding the one-hand grip (tripod unit 16 transformed into the one-hand grip) shown in FIG. 2 with one hand and turning the ball fixing screw 26 with the other hand, the user can put the ball portion 22b of the ball joint 22 into the half locked state. The posture of the ball joint 22 can then be adjusted to a desired posture with the other hand. At this time, the ball joint 22 is in the half locked state, and thus the adjusted posture is maintained even if the user releases the hand from the ball joint 22 (or the camera W). Then, after the posture adjustment is completed, the user can fix the posture of the ball joint 22 by turning the ball fixing screw 26 with the other hand. As a result, the user can easily adjust the posture of the ball joint 22.

Further, in the present embodiment, as shown in FIGS. 1 and 2, the posture of the camera W attached to the pan head unit 14 can be adjusted with respect to the pan head unit 14.

Figure 7:
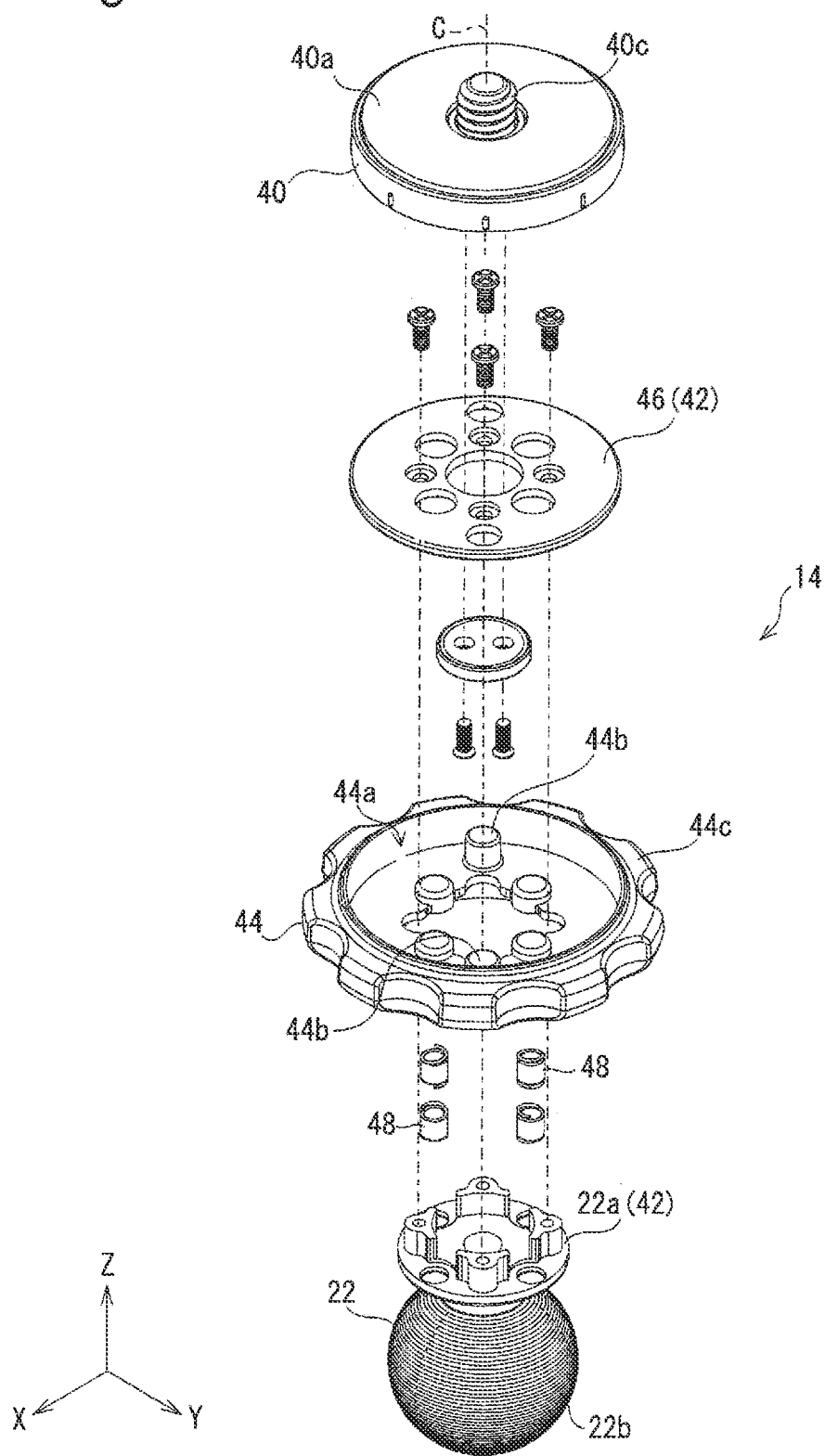
FIG. 7 is an exploded perspective view of a pan head unit.
Figure 8:
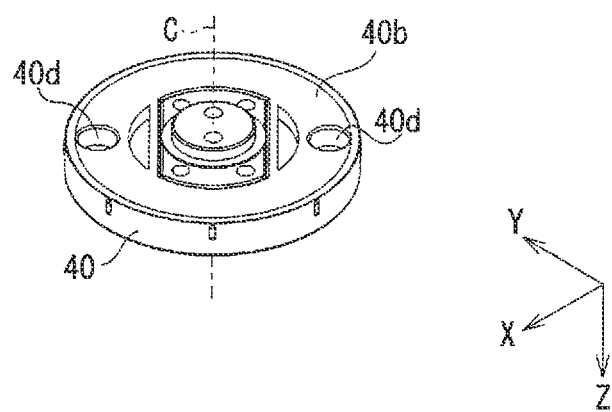
FIG. 8 is a perspective view of a reverse surface of a rotating stage of the pan head unit.

FIG. 7 is an exploded perspective view of the pan head unit. FIG. 8 is a perspective view of a reverse surface of the rotating stage of the pan head unit.

As shown in FIG. 7, the pan head unit 14 includes a rotating stage to which the camera W or the like is fixed, a stage support member 42 rotatably supporting the rotating stage 40, and a stage fixing member 44 selectively fixing the rotating stage 40.

As shown in FIGS. 7 and 8, the rotating stage 40 includes a mounting surface 40a on which the camera W or the like is mounted and a reverse surface 40b opposite to the mounting surface 40a. A fixing screw 40c for fixing the camera W or the like is provided on the mounting surface 40a. Further, the reverse surface 40b is provided with two engaging portions 40d shaped as non-through holes, which will be described in detail later.

In the present embodiment, the stage support member 42 includes the first end 22a of the ball joint 22 and a support plate 46 fixed to the first end 22a of the ball joint 22 and rotatably supporting the rotating stage 40. The stage support member 42 supports the rotating stage 40 so as to be rotatable about a rotation center line C orthogonal to the mounting surface 40a of the rotating stage 40.

The stage fixing member 44 is a disc-shaped member and includes a recess 44a that houses the rotating stage 40. A bottom surface of the recess 44a is provided with two cylindrical engaging portions 44b that engage with two engaging portions 40d shaped as non-through holes of the rotating stage 40. Further, the stage fixing member 44 includes a grip 44c operated by the user on an outer peripheral surface of the stage fixing member 44. Further, the stage fixing member 44 is provided on the stage support member 42 (the first end 22a of the ball joint 22) so as to be movable in an extending direction of the rotation center line C of the rotating stage 40 (Z-axis direction). Further, a plurality of springs 48 is disposed between the stage fixing member 44 and the first end 22a of the ball joint 22.

Figure 9A:
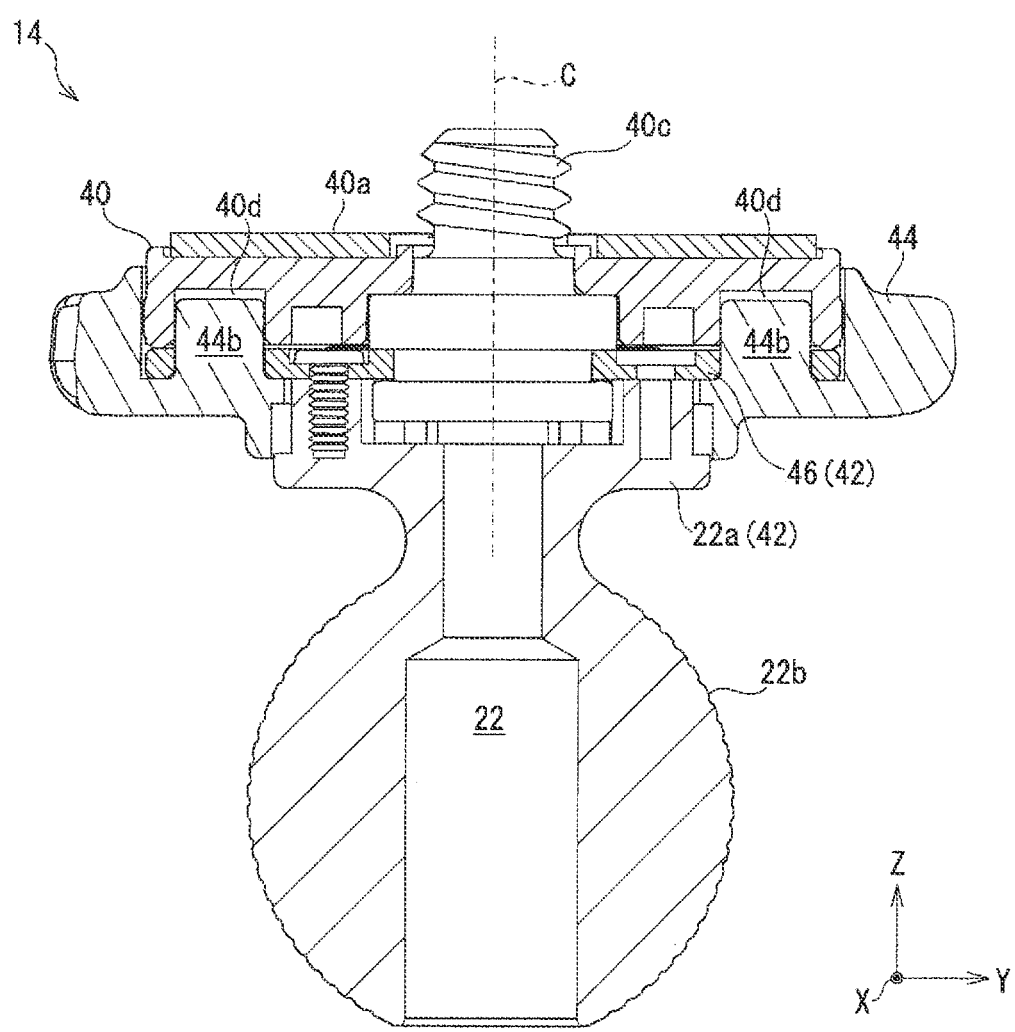
FIG. 9A is a sectional view of the pan head unit with the rotating stage fixed.

FIG. 9A is a sectional view of the pan head unit with the rotating stage fixed. Further, FIG. 9B is a sectional view of the pan head unit with the rotating stage released.

As shown in FIG. 9A, the stage fixing member 44 is urged toward the rotating stage 40 by the springs 48. Thus, the two cylindrical engaging portions 44b of the stage fixing member 44 engage with the engaging portions 40d shaped as non-through holes of the rotating stage 40. As a result, the rotating stage 40 is fixed with limited rotation about the rotation center line C.

Figure 9B:
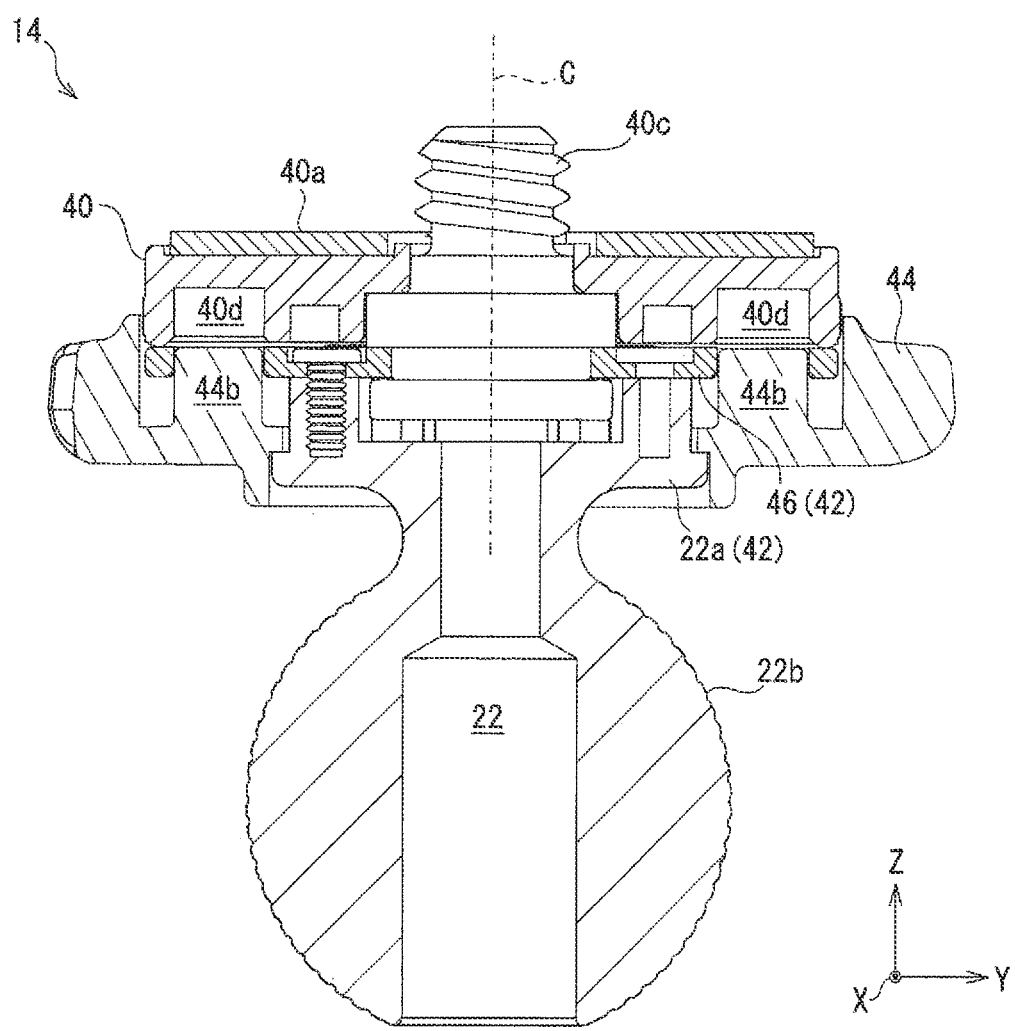
FIG. 9B is a sectional view of the pan head unit with the rotating stage released.

As shown in FIG. 9B, when the stage fixing member 44 is moved away from the rotating stage 40 against an urging force of the springs 48, the two cylindrical engaging portions 44b of the stage fixing member 44 fall off from the two engaging portions 40d shaped as non-through holes of the rotating stage 40. As a result, the rotating stage 40 becomes rotatable about the rotation center line C.

In the present embodiment, the two engaging portions 40d of the rotating stage 40 are symmetrically disposed across the rotation center line C of the rotating stage 40. As a result, the camera W or the like fixed to the rotating stage 40 is rotatable by 180 degrees.

In this pan head unit 14, the user can, for example, hold the one-hand grip (the tripod unit 16 transformed into the one-hand grip) with one hand and operate the stage fixing member 44 with the thumb of the one hand. Then, the user can rotate the rotating stage 40, that is, the camera W or the like fixed to the rotating stage 40 by 180 degrees with the other hand.

There may be three or more engaging portions 40d of the rotating stage 40 (the corresponding engaging portions 44b of the stage fixing member 44).

In the present embodiment as described above, in the support device, the posture of the camera or the like attached to the support device can be easily adjusted.

Although the present disclosure has been described with reference to the above embodiment, the embodiment of the present disclosure is not limited thereto.

For example, in the above embodiment, as shown in FIGS. 4A to 4C, the ball holder 24 and the ball fixing screw 26 are indirectly connected via the cam member 28. This is because the moving direction of the ball holder 24 (Z-axis direction) and the moving direction of the ball fixing screw 26 (Y-axis direction) are different. However, the embodiment of the present disclosure is not limited thereto. The ball holder and the ball fixing screw may move in the same direction, and the ball holder and the ball fixing screw may be directly connected to each other without using the cam member.

Further, for example, in the above embodiment, the cam member 28 is urged by the spring 30 as shown in FIGS. 4A to 4C. However, the embodiment of the present disclosure is not limited thereto. It is sufficient that the member urging the cam member is an elastic member that elastically transforms.

Further, in the above embodiment, as shown in FIGS. 1 and 2, the support device 10 has the tripod unit 16. However, the embodiment of the present disclosure is not limited thereto. For example, the support device may have a tripod unit that is detachable such that another unit different from the tripod unit can be attached and detached or the support device does not have to have a tripod unit. This makes it possible to configure the support device such that a device such as a general-purpose tripod can be attached. For example, instead of the tripod unit, a hand clip such as a one-hand clip may be detachably or integrally attached to the support device.

Furthermore, in the above embodiment, the support device 10 supports the camera W as shown in FIGS. 1 and 2. However, an object supported by the support device 10 is not limited to a camera. The support device may support, for example, a mobile terminal.

In addition, in the above embodiment, the support device 10 has a mechanism that puts the ball joint 22 in the locked state, the half locked state, or the fully locked state (the ball holder 24, the ball fixing screw 26, the cam member 28, and spring 30) and the pan head unit 14 in which the rotating stage on which the camera W or the like is mounted is fixed at predetermined angle positions (positions at 0 degrees and 180 degrees). However, the embodiment of the present disclosure is not limited thereto. For example, the pan head unit may include a stage that does not rotate. Further, for example, the pan head unit may be configured such that the rotating stage can be fixed at an arbitrary angle position. Further, for example, the ball joint may be fixed by a direct contact of the ball fixing screw with the ball portion.

That is, in a broad sense, the support device according to the embodiment of the present disclosure includes a pan head unit, a ball joint having a first end to which the pan head unit is attached and a second end provided with a ball portion, a ball holder configured to selectively fix the ball portion, a ball fixing screw connected to the ball holder and configured to move the ball holder between a locked position at which the ball portion is fixed and an unlocked position at which the ball portion is freely rotatable, and an elastic member configured to urge the ball holder toward the ball portion, in which the ball holder and the ball fixing screw are connected to each other so as to be strokable with a predetermined stroke amount, and the predetermined stroke amount is smaller than a movement amount of the ball fixing screw between a first position corresponding to the locked position and a second position corresponding to the unlocked position.

Further, in a broad sense, the support device according to the embodiment of the present disclosure includes a pan head unit, a ball joint having a first end to which the pan head unit is attached and a second end provided with a ball portion, a ball holder configured to selectively fix the ball portion, a ball fixing screw configured to move the ball holder, and an elastic member configured to urge the ball holder toward the ball portion, in which when the ball fixing screw rotates and moves, a state of the ball portion is changed sequentially to a fully locked state in which the ball fixing screw maintains contact between the ball portion and the ball holder, a half locked state in which the ball portion is not freely rotatable due to the elastic member urging the ball holder but rotatable by an external force, and an unlocked state in which the ball portion is freely rotatable.

Furthermore, in a broad sense, the support device according to the embodiment of the present disclosure includes a casing and a pan head unit provided on the casing, in which the pan head unit includes a rotating stage having a mounting surface and a reverse surface opposite to the mounting surface, a stage support member rotatably supporting the rotating stage about a rotation center line orthogonal to the mounting surface, and a stage fixing member provided on the stage support member so as to be movable in an extending direction of the rotation center line and selectively fixing the rotating stage, and the reverse surface of the rotating stage and the stage fixing member each include an engaging portion engaging with each other in the extending direction of the rotation center line.

As described above, the multiple embodiments have been described as examples of the technique in the present disclosure. To that end, the accompanying drawings and detailed description are provided.

Among the constituent elements described in the accompanying drawings and the detailed description, not only constituent elements essential for solving the problem but also constituent elements not essential for solving the problem can be included in order to exemplify the above technique. Therefore, it should not be immediately recognized that these non-essential components are essential, even if those non-essential components are described in the accompanying drawings or the detailed description.

Further, because the above embodiments are for exemplifying the technique of the present disclosure, various changes, substitutions, additions, omissions, or the like can be made within the scope of the claims or the scope of equivalents thereof.

The present disclosure is applicable to a support device that supports not only a camera but also a device of which posture may be changed, the support device including a ball joint.

What is claimed is:

1. A support device comprising:
a pan head unit;
a ball joint having a first end to which the pan head unit is attached and a second end provided with a ball portion;
a ball holder configured to selectively fix the ball portion;
a ball fixing screw connected to the ball holder and configured to move the ball holder between a locked position at which the ball portion is fixed and an unlocked position at which the ball portion is freely rotatable;
a cam member interposed between the ball holder and the ball fixing screw and connecting the ball holder and the ball fixing screw; and
an elastic member configured to urge the ball holder towards the ball portion via the cam member,
wherein the cam member and the ball fixing screw are connected to each other so the ball fixing screw is strokable relative the cam member with a predetermined stroke amount, and
the predetermined stroke amount is smaller than a movement amount of the ball fixing screw between a first position corresponding to the locked position and a second position corresponding to the unlocked position, in which the ball fixing screw shifts the cam member in a moving direction of the ball fixing screw away from the ball member.

2. The support device according to claim 1,
wherein the ball fixing screw includes a diameter expansion portion at a tip of the ball fixing screw, and
the cam member includes an engaging portion that engages with the diameter expansion portion in order that the ball fixing screw is strokable in the moving direction of the ball fixing screw with the predetermined stroke amount.

3. The support device according to claim 2,
wherein the moving direction of the ball fixing screw and a moving direction of the ball holder are orthogonal to each other,
the cam member has a cam surface that diagonally intersects the moving direction of the ball fixing screw, and
the ball holder has a cam follower surface that diagonally intersects the moving direction of the ball holder and contacts the cam surface of the cam member.

4. The support device according to claim 1,
wherein the pan head unit includes
a rotating stage having a mounting surface and a reverse surface opposite to the mounting surface,
a stage support member rotatably supporting the rotating stage about a rotation center line orthogonal to the mounting surface, and
a stage fixing member provided on the stage support member so as to be movable in an extending direction of the rotation center line to selectively fix the rotating stage, and
the reverse surface of the rotating stage, and the stage fixing member each include an engaging portion engagable with each other in the extending direction of the rotation center line.

5. The support device according to claim 4, wherein the engaging portion of the rotating stage includes two engaging portions symmetrically disposed across the rotation center line.

6. The support device according to claim 1, further comprising a tripod unit, wherein the tripod unit has three legs configured to approach each other and be transformable into a one-hand grip.

7. A support device comprising:
a pan head unit;
a ball joint having a first end to which the pan head unit is attached and a second end provided with a ball portion;
a ball holder configured to selectively fix the ball portion;
a ball fixing screw configured to move the ball holder;
a cam member interposed between the ball holder and the ball fixing screw and connecting the ball holder and the ball fixing screw; and
an elastic member configured to urge the ball holder towards the ball portion via the cam member,
wherein when the ball fixing screw rotates and moves linearly as a result of the rotation, a state of the ball portion is changed sequentially from a fully locked state in which the ball fixing screw fixes the cam member to lock the ball portion against movement, a half locked state in which the ball portion is not freely rotatable due to the elastic member urging the cam member but rotatable by an external force and which the ball fixing screw does not fix the cam member, and to an unlocked state in which the cam member is shifted in a moving direction of the ball fixing screw away from the ball member such that the ball portion is freely rotatable.

\* \* \* \* \*